July 11, 1972 C. BOTKIN 3,676,001
PROCESS FOR MAKING DUPLICATES OF MICROFILM
Filed May 22, 1970 2 Sheets-Sheet 1
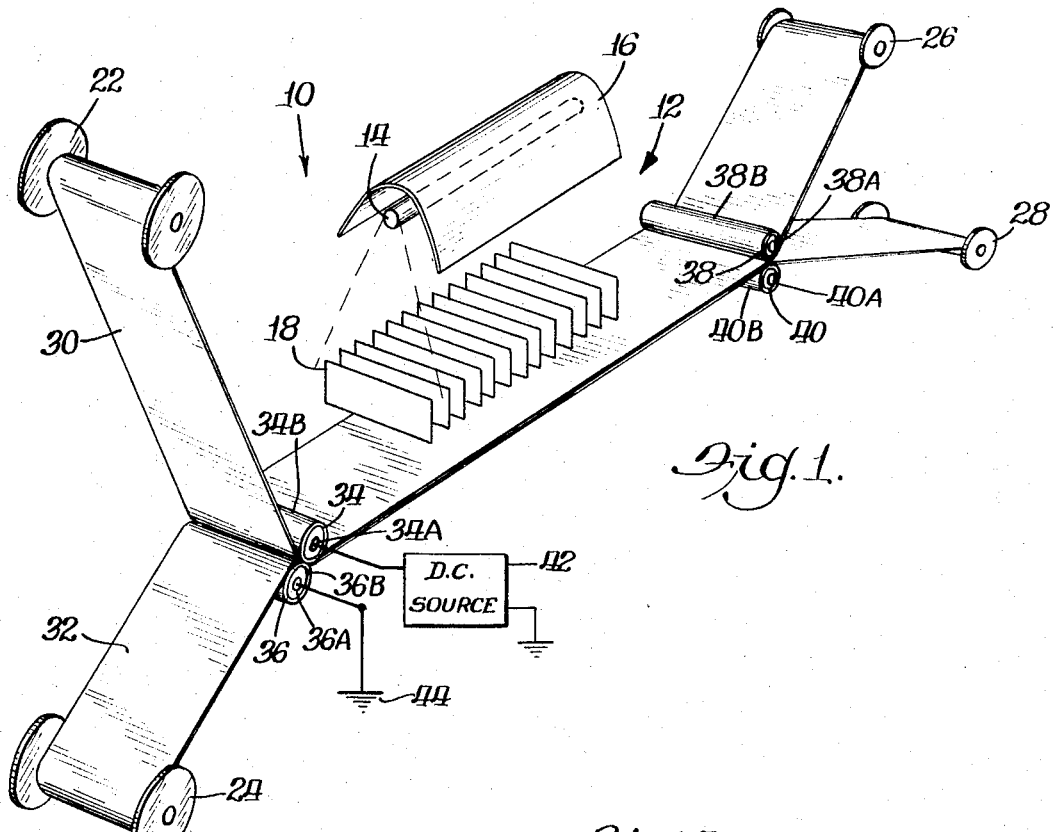
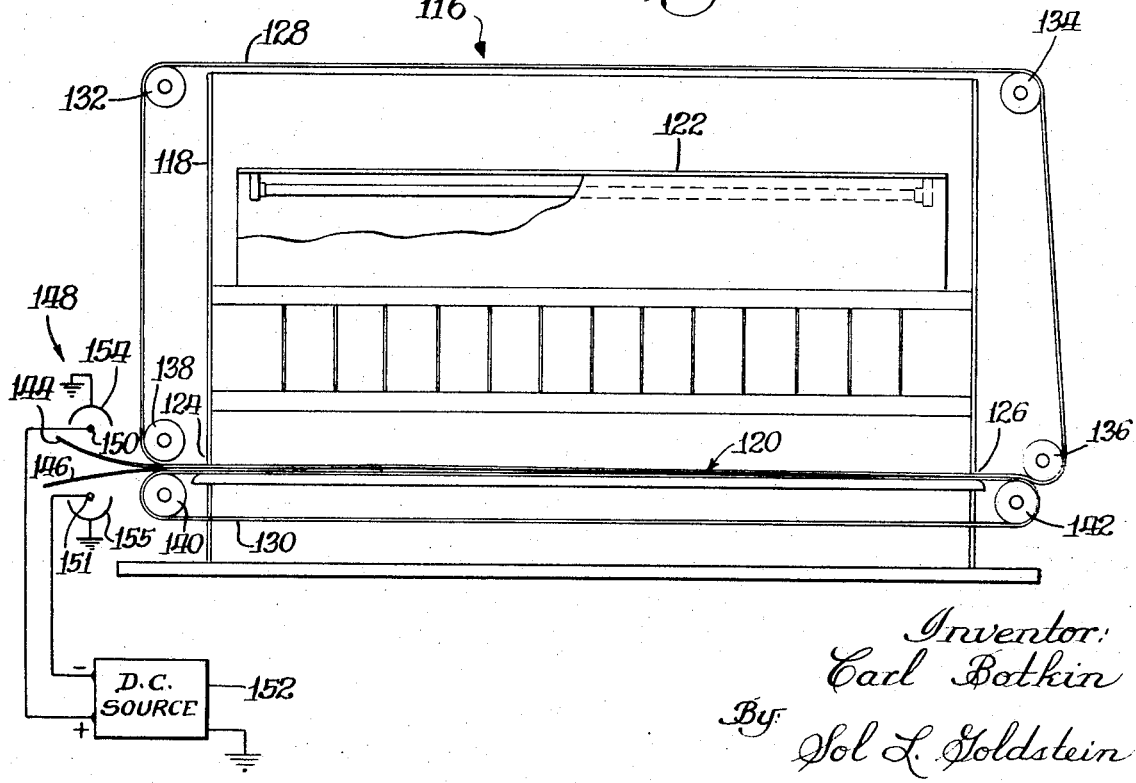
Inventor:
Carl Botkin
By Sol L. Goldstein
Atty.

July 11, 1972 — C. BOTKIN — 3,676,001
PROCESS FOR MAKING DUPLICATES OF MICROFILM
Filed May 22, 1970 — 2 Sheets-Sheet 2

Inventor:
Carl Botkin
By:
Sol L. Goldstein
Atty.

United States Patent Office 3,676,001
Patented July 11, 1972

3,676,001
PROCESS FOR MAKING DUPLICATES OF MICROFILM
Carl Botkin, Glenview, Ill., assignor to Addressograph-Multigraph Corporation, Mount Prospect, Ill.
Filed May 22, 1970, Ser. No. 39,803
Int. Cl. G03b 27/02
U.S. Cl. 355—132
6 Claims

ABSTRACT OF THE DISCLOSURE

Duplicates of reels of microfilms are made by bringing the original film into surface contact with the light sensitive film which is to become the duplicate and then exposing the two films to actinic radiation. The film strips are passed through an electrical field imparting oppositely poled electrostatic charges to the film strips so that they are electrostatically attracted to one another being held in registration during the contact exposure while moving at speeds ranging from 8 feet to 50 feet per minute. The electrostatic charge is generated by corona emission electrodes or contact electrodes.

BACKGROUND OF THE INVENTION

This invention relates generally to methods and means for making duplicates of microfilm records onto other light sensitive film strips and more particularly relates to the techniques of holding the original and light sensitive strips in registration with one another during the step of making a contact exposure.

Microfilm is a well-established medium on which a wide range of data may be recorded for later retrieval by either viewing the film or making a hard copy therefrom. It is desirable in business practices today to generate duplicate copies of a microfilm record so that the information may be available at several different locations which are geographically separate and further to preserve the original record against the risk of loss or damage when it is used in everyday business.

The original microfilm is usually prepared from silver halide sensitized film. A duplicate of such films can be prepared on a wide variety of light sensitive materials including silver systems, dry vesicular diazotype material or conventional diazotype sensitizers. The latter is generally less expensive for the reason that the light sensitive materials themselves are less costly than silver sensitized salts, and the processing to a finished image is simple. While the discussion will be limited to microfilm, it is intended that methods and apparatus be adapted to ordinary movie films, or films on which are recorded electronic video signals. In other words, wherever two film strips are to be retained in continguous relation with one another, this invention may be utilized.

Process for duplicating the original microfilm onto a diazo film of corresponding size requires that the two materials be brought into intimate surface contact with one another and passed through a light exposure station whereby electromagnetic radiation is directed onto the original microfilm making a contact exposure of the light sensitive diazo film on a continual basis without having the films relative to one another during the exposure. It will readily be appreciated that such relative movement or slippage, even very slightly of one of the film strips would distort the exposure.

Various techniques exist for maintaining two moving films in registration which may travel through the exposure station at a rate of 8 to 150 feet per minute, depending on the light response of the duplicate film and the intensity of the electromagnetic or actinic radiation. One method to hold the two materials in registration and prevent slippage between the two surfaces is to decrease air pressure between the films. The pressure differential is created by removing the air from between the two film surfaces so that they are forced into intimate contact by the low pressure at the interface between the films causing atmospheric pressure to keep them in intimate contact. Such techniques are not successful because of the difficulty of consistently maintaining a low pressure area over a long travel path or a wide area of film.

Another technique employed is to slide the two surfaces over a transparent platen while driving the two film strips from a single driving element and thereby maintain both elements in intimate contact and prevent slippage. The deficiency which such a sliding, frictional, contact presents is possible scratching and abrasion of original film surface. This risk of abrasion is undesirable since the purpose of making a duplicate was to reduce the risk of damage to the microfilm original.

SUMMARY OF THE INVENTION

It has been found that through the application of an electrostatic charge to the surface of one of the films, or to both of the films, when they converge to a common meeting point, electrostatic charges will be induced on adjacent surfaces of opposite polarity causing the strips to be attracted to one another so that they may be properly exposed to the actinic radiation without risk of slippage or loss of contact required for contact exposure.

The electrostatic charge may be applied by a variety of well known devices including supplying voltage from an energy source to the core of a guide roller which makes contact with one of the surfaces thereby applying an electrostatic charge to the one surface. Another technique is to direct the emission from a corona electrode against the moving webs to generate an electrostatic charge on the surfaces.

Electrical properties of the films readily lend themselves to such a process. Since most of the films are prepared on a cellulose ester or polyester base having resistivities in the range of $10^{12}$ to $10^{15}$ ohm-centimeters, they readily accept an electrostatic charge in most environments. Understandably, in a highly humid environment, such as for example, an excess of 60% relative humidity, it may be difficult to apply and sustain an electrostatic charge to the surfaces. In such a circumstance, the problem has been readily overcome by reducing the humidity through heating elements which are regulated by a conventional humidistat-type control. Such a humidity control is described in U.S. Pat. 3,349,221, issued on Oct. 24, 1967, and assigned to the same assignee as the instant invention.

The two film strips brought into intimate and contiguous contact during exposure, require mechanical means to separate the films at the conclusion of the exposure cycle. Such mechanical means may be separate spool wind-ups which direct the webs in different directions as they emerge from the exposure station. Separation can be accomplished by discharging the films.

From the exposure station the exposed light sensitive film is directed to a suitable developing station where the latent image bearing film strip is developed into a visible and readable image. In the case of using a two-component diazo sensitized film, such development is readily accomplished by passing the film strip through an ammonia chamber. When using one-component materials, the conventional coupler-containing developer liquids may be applied to the film surface to produce a visible image.

It is a general object of the instant invention to provide a method of making duplicates of microfilm by contact printing whereby the films are held in intimate contiguous surface contact with one another for rapid passage through an exposure chamber without slippage with respect to one another.

It is a further object of the instant invention to provide a method of making duplicates of a microfilm original by removably causing the film strips to adhere to one another during the exposure step so that the strips are held in intimate contact for optimum exposure without slippage.

It is a specific object of the instant invention to provide a method for making duplicate copies of a microfilm original through the use of electrostatic forces imparted to the film strips prior to entry into an exposure chamber assuring complete intimate contact with one surface to another during the exposure step and therein said closely held strips are routinely separated by mechanical means.

BRIEF DESCRIPTION OF THE DRAWINGS

A more complete understanding of the operation of the method and construction of the apparatus will be realized by having reference to the following drawings in which:

FIG. 1 is a perspective of the general construction of the apparatus adapted to carry out the method of this invention;

FIG. 4 is a schematic of another embodiment of the apparatus capable of carrying out the method of the instant invention utilizing two transparent endless belts which converge along a common path through the exposure station and in which the microfilm original and light sensitive film strips are fed in as separate elements.

DESCRIPTION OF THE PREFERRED EMBODIMENTS

Figure 2:
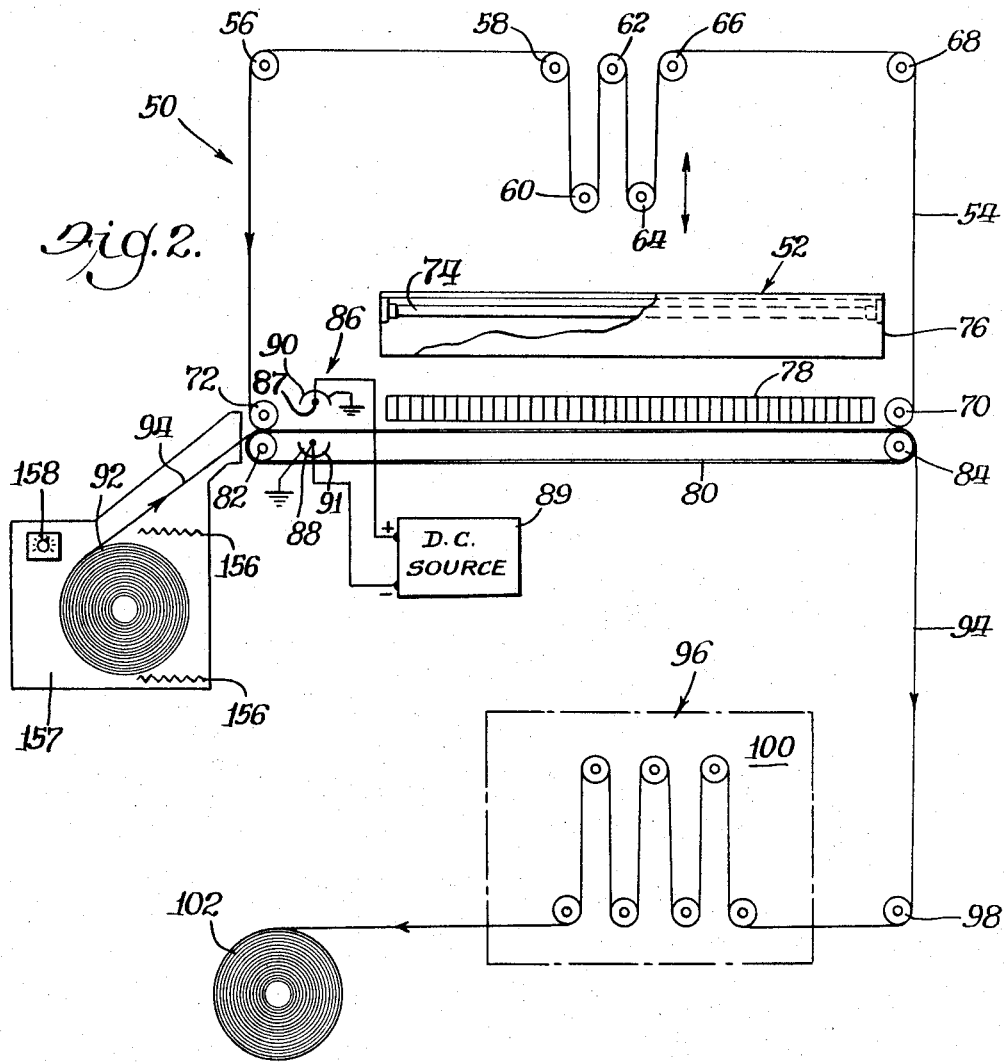
FIG. 2 is a schematic presentation of another embodiment of the instant invention in which the microfilm original is formed into a continuous loop which is cycled past the exposure station and the light sensitive material is directed to a developing station.

Referring to FIG. 1 of the drawings there is shown a schematic representation of an exposure section identified generally with the numeral 10 and which includes an exposure station identified generally as 12.

The exposure station 12 is made up of a source of electromagnetic radiation 14 which is actinic in character in order to expose the light sensitive material which is being exposed. The radiation source 14 is disposed in a parabolic reflector 16 which directs the radiation onto a light collimating device 18 which is comprised of an array of vertically aligned and spaced apart plates, the function of the illuminating device 18 is to direct the radiation from the lamp 14 along a path normal to the subject to be illuminated and to prevent as much of the radiation which is angularly directed from striking the subject. This requirement can readily be appreciated in view of the fact that the exposure is achieved by placing the light sensitive material and the microfilm original in intimate contact with one another. Angularly incident radiation onto the microfilm would tend to undercut the micro-images causing severe loss in resolution.

Arranged on either side of the illuminating source are sets of unwind and wind-up reels identified as 22, 24 and 26, 28, respectively. Reels 22 and 26 contain the strip of the microfilm original being stored and unwound from reel 22 and being taken up on reel 26. The light sensitive film 32 is spooled from reel 24 and is wound up on reel 28.

Intermediate the reel sets 22, 24 and 26, 28, are two sets of friction rollers 34, 36 and 38, 40, which represent the entryway and exitway to the exposure station 12, respectively. The construction of each of the rollers 34, 36 and 38, 40, include conductive cores 34A, 36A and 38A, 40A, each conductive core being sheathed with a thickness of soft pliable rubber 34B, 36B and 38B, 40B, associated with each roller.

Affixed to the core 34A of roller 34 is a DC potential source 42 which supplies a voltage to the core in the range of from 100 volts to 1000 volts. The core 36A of roller 36 is connected to a reference potential 44, preferably ground connection, so that there is established a potential gradient between the core 34A and 36A in the range of 100 to 10,000 volts.

The construction of the rubber-like sheaths 34B and 36B with respect to their thickness is in the range of ¼ inch to ¾ inch, and their resistivity is in the range of $10^5$ to $10^{12}$ ohm-centimeters readily permits the establishment of the necessary potential gradient between the rollers 34 and 36.

The microfilm original strip 30 is mounted on the unwind reel 22 and the leader portion of the roll is threaded between the rollers 34 and 36 past the exposure station 12, and thence between rollers 38 and 40 and affixed to the wind-up reel 26.

The light sensitive film 32 is mounted on the unwind roll 24 and the suitable leader portion is also threaded between the rollers 34, 36, and through the exposure station 12 and exits from the exposure station between rollers 38 and 40, being affixed to the unwind reel 28. It will be appreciated that the rollers 34, 36 and 38, 40 are mounted spaced apart spanning the exposure station 12 and providing a suitable plane of exposure by maintaining the webs 30 and 32 in a taut planar condition as they pass beneath the source of actinic radiation 14 and the light collimating plates 18. Once the unit is threaded, the energy source 42 is turned on, and a voltage is applied to the core 34A in the range of 300 to 350 volts establishing a potential gradient between the core and the reference potential (ground) thereby applying an electrostatic charge to the rubber surface 34B. This in turn results in the induction of oppositely poled charges to the strips 30 and 32 as they enter the nipping portion between the rollers 34 and 36.

As the assemblage of strips 30 and 32 pass into the nip between rollers 34 and 36, the electrostatic charge causes the elements to cling together as they course through the exposure station 12 so that the surfaces are forced into intimate and contiguous contact with one another, being separated mechanically as they exit from between the rollers 38 and 40. In order to maintain the webs in a taut condition, the rollers 22 and 24 may be equipped with suitable braking means (not shown) and while the reels 26 and 28 are coupled to a single drive mechanism (not shown) so that they move at the same rate of speed while keeping the strips 30 and 32 under tension.

Referring to FIG. 2 there is shown another embodiment of the invention bearing the identification and numeral 50. The exposure station 52 is disposed inside an endless belt 54 which constitutes the microfilm original to be reproduced. The belt 54 is disposed about a series of axially parallel rollers 56, 58, 60, 62, 64, 66, 68, 70 and 72 forming a generally rectangular path. The endless belt 54 moves in a generally rectangular path over the series of rollers, a portion of said path moving between rollers 70 and 72 takes the strip through the exposure station 52.

The exposure station 52 includes a source of actinic radiation 74 mounted in a parabolic reflector 76 which directs the radiation onto a light collimating structure 78 before the radiation strikes the portion of the belt traveling between the rollers 70 and 72.

A second conveying structure in the form of a transparent endless belt 80, is arranged about a pair of drive rollers 82 and 84, which are actually aligned with rollers 72 and 70, respectively. The roller sets 72, 82 and 70, 84, form an entryway and exitway at the nipping portions of the roll, respectively, to the exposure station 52. The roller sets positioned as they are and in spaced apart relationship while maintaining the belt materials in a taut and stretched condition serve to form a flat planar conveyor formed between the strip element 54 and 80 which are brought into intimate contact with one another.

Disposed adjacent the rollers 72 and 81, directed at the nip where the strips 54 and 80 converge at the entryway are positioned electrostatic charge generating device 86 which includes upper and lower corona wires 87 and 88, connected to a high potential DC source 89. The corona wires 87 and 88 are contained in metallic shields 90 and 91 each connected to ground. Applying a voltage in the range of 3 to 10 thousand volts plus and minus to the wires 87 and 88, respectively, causes ionization of the atmosphere in the immediate vicinity of the electrode causing the air to become conductive forming a path along which the electrons are conducted to the strips 54 and 80 depositing electrostatic charges thereon.

The light sensitive film from which the duplicate of the microfilm original 54 is to be prepared is wound on a spool 92 from which a length 94 of film is directed into the infeed station being sandwiched between the strips 54 and 80. The deposition of electrostatic charges onto the strip 54 induces an oppositely poled charge to the strip 94 and 82 so as to form a three-element assemblage having oppositely poled charges at their respective interfaces causing the assemblage to be electrostatically "locked" for the duration of the traverse through the exposure station. The strips 80 and 54 are mechanically separated from one another at the exitway by the direction imparted to the strips by the respective drive systems and the strip 94 is directed to a developer station identified generally as 96 through which the strip is directed by the drive roller 98 into a chamber 100. The type of development that occurs inside the chamber 100 is conventional for diazo systems appropriate to either one-component or two-component type development. It may also include heating elements or devices suitable for heat developable diazo compounds or vesicular diazo materials. In the circumstance that another type of light sensitive system is employed, the developer station 96 may be equipped with the necessary chemical components to effect development of the particular latent image into a visible image.

The microfilm duplicate is wound up on a spool 102 as the duplicate emerges from the developing station.

Figure 3:
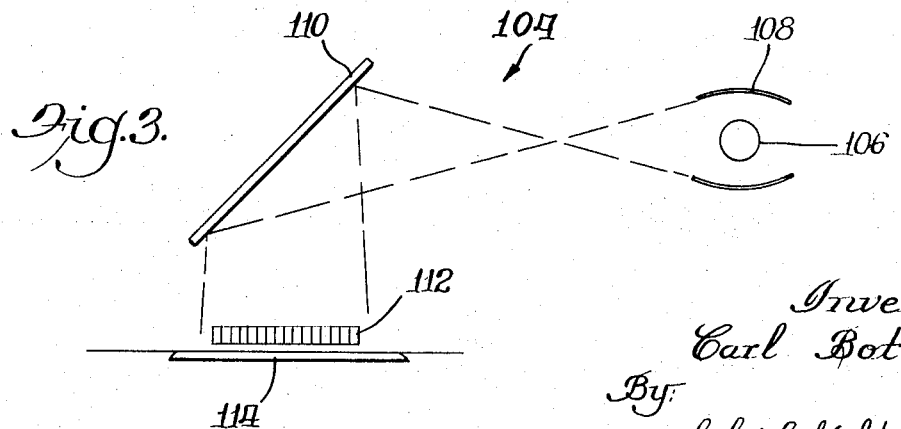
FIG. 3 is an enlarged detail of illuminating means which can be utilized in any of the embodiments of the instant invention.

The foregoing descriptions relating to FIGS. 1 and 2 described the exposure stations 12 and 52 as being equipped with an actinic radiation source and a light collimating means as part of the exposure structure. Referring to FIG. 3 there is shown another embodiment of an illuminating device identified generally as 104 which may be substituted for the devices illustrated in FIGS. 1 and 2. The device 104 comprises an actinic radiation source 106 disposed inside a suitable reflector housing 108 which directs radiation onto a reflective surface 110 from which it is cast onto the light collimating structure 112 and thence onto an assemblage 114 which may comprise the microfilm original and the light sensitive strip. The device 104 is an alternative embodiment for an illuminating device permits folding the system so as to render more compact the processing apparatus.

Referring to FIG. 4 there is shown another embodiment of a processing apparatus identified generally as 116 containing an enclosure 118 equipped with an exposure area 120 inside the housing. Above the exposure area 120 is an illuminating device 122 similar in construction to the illuminating devices described in connection with FIGS. 1 and 2. The enclosure 118 has an entryway 124 and an exitway 126 through which an assemblage of film strips may pass through the exposure area 120. The assemblage comprises a set of endless belts 128 and 130 each coursing over a set of rollers which converge along a common pathway that enters through the entryway 124 and which exits through the exitway 126.

The belt 128 is stretched over a series of rollers 132, 134, 136 and 138, which are axially parallel to one another. The endless belt 130 is stretched over rollers 140 and 142 which are juxtaposed the rollers 138 and 136, respectively. The rollers 140 and 138 are disposed in front of the entryway 124 just outside the exitway 126, rollers 136 and 142 are located. The belt portions are directed over a common path by virtue of the location of the rollers 138, 140 and maintained in a taut, planar condition by the tension resulting from the spaced apart rollers 136 and 142.

To complete the assemblage passing through the exposure area 120 between the path common to both the belts 130 and 128 is the microfilm original strip 144 and the light sensitive strip 146 which is to become the duplicate. The strips 144 and 146 are fed in from suitable reels (not shown) into the nip formed by the converging strips 130 and 128 passing over the rollers 138 and 140 forming a four-element assemblage.

In order to successfully practice the contact exposure of the strips 144 and 146 is the establishment of an electrostatic charge on the elements so that they are retained in contiguous intimate surface contact with one another without disruption in order to make a high quality reproduction. Adjacent the nip of the rollers 140 and 138 is a charge generating device 148 which is similar in construction to the charge generating device 86 described in connection with FIG. 2. It comprises a pair of corona wires 150 and 151 connected to the plus and minus terminals, respectively, of a DC power source 152. The corona wires 150 and 151 are contained in conductive shields 154 and 155 which are connected to ground. Upon the application of power to each wire in the range of 3 to 10 thousand plus and minus volts, respectively, electrostatic charges are emitted therefrom which are deposited on the original strip 144 and negative charges on the strip 146 thereby inducing oppositely poled charges on the other elements which comprise the assemblages causing them to electrostatically "lock" so that they are retained in a fixed position. At the conclusion of the contact exposure step in which the radiation from the actinic radiation source in the illuminating device 122, there is produced on the light sensitive strip 146 an image pattern corresponding to the subject matter on the microfilm original 144. As the strips emerge from the apparatus through the exitway 126 and out from between the endless belts 128 and 130 the exposure strip is directed to a developing station such as described hereinabove while the strip 144 may be wound up on a suitable roll (not shown) reel (not shown) or otherwise reinserted into the entryway to make another duplicate.

In place of the strips 144 and 146 the arrangement could be used to make duplicates of fiche cards. By merely hand collating an original fiche with the duplicate fiche the set can be fed between the belts 128 and 130 and properly exposed without fear of the fiche cards shifting from their collated positions.

In each of the constructions described hereinabove, there may optionally be included humidity control elements which consist of a heating coil which is responsive to a humidity control sensor so that the moisture content in the general atmosphere in the exposure station is maintained at a level which does not impair the retention of the electrostatic charge on the various belts passing therethrough. The construction of such a humidity control is shown in FIG. 2 wherein a pair of heating coils 156 are disposed proximate the roll supply 92 inside the enclosure 157. A humidity sensing device 158 is likewise located inside the chamber which has the effect of regulating the temperature within the chamber. As is conventional in controls of this type when the humidity reaches a certain predetermined level as recorded in the humidistat, it will energize the heating coils 156 until the humidity level due to the increased temperature in the enclosure 157 is decreased sufficiently to where the humidity drops to a level where it no longer endangers the ability of the films to retain an electrostatic charge thereon. It has been found that electrostatic charge is best retained on the surface in environments in which the relative humidity is below 30%. Accordingly, the humidistat would, for most types of films, be adjusted to call for adding heat to the enclosure by energizing the heating coils 156 when the humidity reaches above 30%.

It will be understood that the use of such a humidity control, while described in connection with FIG. 4 is or may be adapted with equal success to the other embodiments described herein.

What is claimed is:

1. The method of making a reproduction of an original film strip having a series of exposure frames thereon onto a light sensitive film strip of corresponding size comprising the steps of:

feeding the original and light sensitive film strips to an exposure station from separate unwind stations, bringing the respective film strips into contiguous contact and in registration with one another at a location in advance of said exposure station, applying an electrostatic charge of sufficient potential to the surface of at least one of the film strips at said location causing the strips to be electrostatically attracted to one another so as to maintain said strips in registration during the exposure step, exposing said contiguous film strips by directing electromagnetic radiation onto said original film, positively separating said strips after exposure and directing the exposed light sensitive film to a developing station.

2. The method as set forth in claim 1 wherein said films are moving at the same speed during exposure.

3. The method as set forth in claim 1 wherein the two film strips are maintained in a planar path when said strips are brought into contiguous contact until they are separated.

4. The method as set forth in claim 1 wherein the electrostatic charge is applied by a corona emission electrode juxtaposed one of said surfaces at said location.

5. The method as set forth in claim 1 wherein the electromagnetic radiation is directed through a light collimating structure.

6. The method of making a reproduction of an original film strip having a series of images thereon onto a light sensitive film strip of corresponding size comprising the steps of:

feeding the original film and light sensitive film respectively from separate unwind stations to an exposure station, bringing the respective film strips together into contiguous contact and in registration with one another by passing said strips between a pair of rollers whose surfaces are sufficiently separated to receive the thickness of said film strips therebetween, applying a potential to one of said rollers whereby an electrostatic charge is imparted to the surface of one of said strips causing the strips to be electrostatically attracted to one another so as to maintain said strips in registration, moving said strips under the influence of said electrostatic attracting charge over a planar course while maintaining said strips in registration, applying electromagnetic radiation to the surface of said original film while it is moving over said planar course, positively separating said film after exposure and directing the exposed sensitized film to a developing station.

References Cited

UNITED STATES PATENTS

| | | | |
|---|---|---|---|
| 3,396,645 | 8/1968 | Macklem | 355—12 |
| 3,468,606 | 9/1969 | Wolf et al. | 355—91 |
| 3,437,336 | 4/1969 | Enke et al. | 355—3 X |
| 3,309,960 | 3/1967 | Delplanque | 355—3 |
| 3,064,546 | 11/1962 | Hutchins | 355—99 |

FOREIGN PATENTS

| | | | |
|---|---|---|---|
| 1,063,203 | 3/1967 | Great Britain | 355—12 |

SAMUEL S. MATTHEWS, Primary Examiner

F. L. BRAUN, Assistant Examiner

U.S. Cl. X.R.

355—12